United States Patent Office 3,324,046
Patented June 6, 1967

3,324,046
CATALYST COMPOSITION FOR OXIDATION OF HYDROGEN CHLORIDE TO PRODUCE CHLORINE
Gordon Diprose, Northwich, England, assignor to Imperial Chemical Industries Limited, London, England, a corporation of Great Britain
No Drawing. Filed July 29, 1963, Ser. No. 298,480
Claims priority, application Great Britain, Aug. 8, 1962, 30,405/62
1 Claim. (Cl. 252—441)

This invention relates to an improved process for the manufacture of chlorine from gaseous hydrogen chloride particularly when the latter is formed by the dissociation of ammonium chloride in the vapour phase.

Processes for making chlorine from hydrogen chloride have been described that comprise two essential stages: a chlorination stage in which hydrogen chloride gas or vaporized ammonium chloride reacts with a metal oxide to give the corresponding metal chloride, and an oxidation stage in which the metal chloride is oxidised by reaction with air or oxygen to liberate chlorine and regenerate the metal oxide. These stages can be illustrated by the following equations in which the metal is iron.

$$2Fe_2O_3 + 12NH_4Cl \rightarrow 4FeCl_3 + 12NH_3 + 6H_2O$$
$$4FeCl_3 + 3O_2 \rightarrow 2Fe_2O_3 + 6Cl_2.$$

These processes had disadvantages when ammonium chloride was the source of hydrogen chloride in that much of the ammonia was destroyed in side reactions with the metal chloride as the latter was formed, particularly with metal chlorides that could be reduced to lower chlorides. With ferric chloride for example the reaction with ammonia can follow the equation $$6FeCl_3 + 2NH_3 \rightarrow 6FeCl_2 + 6HCl + N_2$$

To avoid destruction of ammonia it has been proposed to introduce a third or reduction stage in which metal oxide is partially reduced to a lower oxide by means for example of hydrogen, water gas or coal gas. When the lower oxide is reacted with the vapour of ammonium chloride a lower chloride is formed together with some higher chloride, but the proportion of the latter is small enough to ensure the amount of ammonia destroyed is much reduced.

It has also been proposed, for example in U.S. patent specification No. 2,206,399 to have present with the metal chloride/oxide a second salt, for example an alkali metal chloride, able to reduce the volatility of the principal metal chloride at reaction temperatures, and so enable the oxidation stage to be carried out at higher temperatures. Potassium chloride has been described as the most suitable second salt for this purpose. It has also been proposed to add a third chloride or oxide to the mixture of metal chloride and potassium chloride in order to promote the oxidation reactions. Suitable third salts are cupric chloride, cadmium chloride, lead chloride and nickel chloride, of which cupric chloride is preferred. A typical mixture of the three salts would contain 100 parts by weight of ferric chloride, 50 of potassium chloride and 20 of cupric chloride, and it would be supported on an inert carrier mass for example calcined silica granules. When such a mixture has been through the oxidation stage it consists essentially of ferric oxide and unchanged potassium chloride and cupric chloride and cupric oxychloride. If it now be subjected to the reduction stage not only ferric oxide but also cupric chloride and cupric oxychloride are reduced, and in reducing the copper salts there is a waste of reducing agent. The following equations show how in reducing cupric oxychloride hydrogen is wastefully converted to water and hydrogen chloride and contributes nothing to the process as a whole for making chlorine except its heat of reaction.

(i) reduction stage — 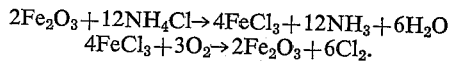
(ii) chlorination stage—$2Cu + 2HCl \rightarrow 2CuCl + H_2$
(iii) oxidation stage—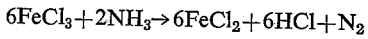

For example, in a reaction mass in which the atomic ratio Fe:K:Cu is 3:3:1 as much hydrogen is wastefully employed in reducing $CuO.CuCl_2$ as is usefully employed in reducing $Fe_2O_3$. Most of the alternative promoters to cupric chloride are either equally reducible or non-effective. The concentration of cupric chloride relative to that of ferric and potassium chlorides could of course be reduced in order to lessen the wastage of hydrogen, but this would markedly lower the efficiency of the oxidation stage.

We have now discovered that the concentration of cupric chloride can be much reduced without affecting the efficiency of the oxidation stage if oxides and chlorides of rare earths, which are non-reducible by hydrogen under the reaction conditions, are included in the mixture.

According to our invention a cyclic process for making chlorine in which in one stage ammonium chloride vapour is reacted with a mass including lower oxides of iron and chlorides of potassium and copper whereby said oxides of iron are converted to chlorides of iron, and in the next stage the mass of chlorides of iron and of potassium and of copper is reacted with an oxygen-containing gas whereby by chlorine is liberated from the iron chlorides and the latter oxidised to iron oxides, and in the next stage the mass of iron oxides and chlorides of potassium and copper is reacted with a hydrogen-containing gas whereby higher iron oxides are reduced to lower iron oxides and the mass reverts substantially to what it was at the beginning of the first stage, is characterised in that rare earth oxides and chlorides are also present in said masses.

The preferred rare earth oxides and chlorides are those of cerium, and those known as technical grades of cerium oxide and cerium chloride are as effective as pure cerium oxide and cerium chloride. The technical grade of cerium oxide is defined as a mixture containing approximately 50% by weight of $CeO_2$ and 50% by weight of mixed other rare earth oxides of the lanthanum sub-group. Technical grade cerium chloride is defined similarly. The proportion of cerium to copper in the mass is conveniently from 2:1 to 6:1 in terms of gramme atoms. For example, a mass whose composition expressed as gramme-atom ratios Fe:K:Ce:Cu is 15:15:5:1 has as high an efficiency in the oxidation stage as the known mass in which the gramme-atom ratios Fe:K:Cu are 15:15:5, and it enables an 80% reduction in wasteful hydrogen consumption to be achieved, corresponding to a 40% reduction in overall consumption of hydrogen.

The effect of having different proportions of cerium compounds present in the mixture of chlorides of iron, potassium and copper is illustrated by the results of six comparative experiments summarised in the table below. In each experiment the gramme-atom ratios Fe:K:Cu in the mixture of chlorides of these metals were 15:15:1, and the mixture was supported on inert alumina-silica granules and constituted a column 29.5 cms. high, 3.3 cms. diameter containing 160 g. of material and 15.0 g. available chlorine. The reaction temperature was 500° C. in each experiment and air was passed through the mixture as oxidising agent. When oxidising a fixed bed of chloride-bearing granules with air chlorine is evolved initially at a constant concentration which in these experiments was 31–32% by volume. The fraction of total available chlorine that is evolved at this constant concentration is a qualitative indication of the rate of reaction. For example a small fraction indicates a slow rate of reaction and a larger fraction a faster rate, and so on. These fractions, expressed as percentages, are given in the right-hand column of the table, and show that an increase in the gramme-atom ratio Ce:Cu from 0 up to 3:1 leads to a large increase in reaction rate and thereafter an increase in the ratio does not much increase the rate. At lower temperatures of the order of 450° C. results of comparative experiments indicate that the largest increase in reaction rate is reached when the ratio approaches 6:1.

TABLE

| G. atom ratio Ce:Cu | Temp., ° C. | Air velocity, cm./sec. | Total available Cl evolved at constant concentration, percent |
|---|---|---|---|
| 0 | 500 | 2.34 | 0 |
| 1 | 500 | 2.25 | 28.5 |
| 2 | 500 | 2.23 | 34.0 |
| 3 | 500 | 2.20 | 45.5 |
| 4 | 500 | 2.27 | 46.7 |
| 5 | 500 | 2.27 | 49.0 |

What I claim is:

A mass adapted for the oxidation of hydrogen chloride to give chlorine consisting essentially of an inert support, and chlorides and oxides of iron, chlorides of potassium and of copper, and a member of the group consisting of cerium oxide, a mixture of approximately 50% by weight of cerium oxide and 50% by weight of other mixed rare earth oxides of the lanthanum sub-group, cerium chloride and a mixture of approximately 50% by weight of cerium chlorides and 50% by weight of other mixed rare earth chlorides of the lanthanum sub-group, in which the ratio of iron/potassium/cerium/copper is approximately 15:15:2–5:1, said ratio being expressed in terms of gramme atoms.

References Cited

UNITED STATES PATENTS

| 925,253 | 6/1909 | Whitehouse | 23—219 |
| 2,204,733 | 6/1940 | Miller | 23—219 |
| 2,206,399 | 7/1940 | Grosvenor et al. | 23—219 |
| 2,418,931 | 4/1947 | Gorin | 23—219 |
| 2,448,255 | 8/1958 | DeBenedictis et al. | 252—441 |
| 2,542,961 | 2/1951 | Johnson et al. | 23—219 |
| 2,577,808 | 12/1951 | Pye et al. | 23—219 |
| 3,010,913 | 11/1961 | Price | 252—441 |
| 3,103,419 | 9/1963 | Hunter et al. | 23—219 |

FOREIGN PATENTS

| 247,371 | 10/1963 | Australia. |
| 249,950 | 3/1964 | Australia. |

OSCAR R. VERTIZ, Primary Examiner.

EDWARD STERN, MILTON WEISSMAN, Examiners.